United States Patent
Wang et al.

(10) Patent No.: US 11,218,221 B2
(45) Date of Patent: Jan. 4, 2022

(54) TRANSMITTER OPTICAL SUBASSEMBLY, OPTICAL COMPONENT, OPTICAL MODULE, AND PASSIVE OPTICAL NETWORK SYSTEM

(71) Applicant: HUAWEI TECHNOLOGIES CO., LTD., Guangdong (CN)

(72) Inventors: Lingjie Wang, Lima (PE); Enyu Zhou, Dongguan (CN); Sulin Yang, Dongguan (CN); Zhenxing Liao, Wuhan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 238 days.

(21) Appl. No.: 16/453,743

(22) Filed: Jun. 26, 2019

(65) Prior Publication Data

US 2019/0319710 A1    Oct. 17, 2019

Related U.S. Application Data

(63) Continuation of application No. PCT/CN2016/112736, filed on Dec. 28, 2016.

(51) Int. Cl.
*H04B 10/50* (2013.01)
*G02B 27/28* (2006.01)

(52) U.S. Cl.
CPC ......... *H04B 10/503* (2013.01); *G02B 27/283* (2013.01); *G02B 27/286* (2013.01)

(58) Field of Classification Search
CPC .... G02B 27/283; G02B 27/286; H04B 10/50; H04B 10/503

(Continued)

(56) References Cited

U.S. PATENT DOCUMENTS

| 5,379,135 A | 1/1995 | Nakagaki et al. |
| 6,081,635 A * | 6/2000 | Hehmann ............ G02B 6/2746 359/484.03 |

(Continued)

FOREIGN PATENT DOCUMENTS

| CN | 102252764 A | 11/2011 |
| CN | 104459904 A | 3/2015 |

(Continued)

OTHER PUBLICATIONS

Berger et al; Tunable MEMS Devices for Optical Networks; Mar. 2003; Optics and Photonics News optical society of America; pp. 1-10. (Year: 2003).*

(Continued)

*Primary Examiner* — Amritbir K Sandhu
(74) *Attorney, Agent, or Firm* — Womble Bond Dickinson (US) LLP

(57) ABSTRACT

A transmitter optical subassembly is disclosed including a substrate and a direct modulated laser disposed on the substrate. A single-stage isolator, a polarization direction rotator, and an optical branching filter are disposed side by side on the substrate in a light propagation direction. The polarization direction rotator can adjust linearly polarized light to P-polarized light, the optical branching filter includes an optical splitter subassembly and a filter subassembly, and an optical splitter film in the optical splitter subassembly is an optical splitter film with P polarization. The polarization direction rotator adjusts the incident linearly polarized light to the P-polarized light, and the optical splitter film in the optical branching filter is the optical splitter film with P polarization; all P-polarized light with single polarization can pass through the optical branching filter, without causing any polarization loss or two peaks.

17 Claims, 2 Drawing Sheets

(58) Field of Classification Search
USPC .................................................. 359/498.07
See application file for complete search history.

(56) References Cited

U.S. PATENT DOCUMENTS

| | | | |
|---|---|---|---|
| 8,168,939 B2* | 5/2012 | Mack .................. | G02B 6/4208 250/225 |
| 9,444,218 B1* | 9/2016 | Huang ................. | H01S 5/0264 |
| 10,613,339 B2* | 4/2020 | Zhou ................... | G02B 6/4206 |
| 2005/0157397 A1 | 7/2005 | Efimov et al. | |
| 2007/0183792 A1 | 8/2007 | McCallion et al. | |
| 2009/0208225 A1* | 8/2009 | Daghighian .......... | G02F 1/0136 398/184 |
| 2013/0038933 A1 | 2/2013 | Wang et al. | |
| 2015/0104179 A1* | 4/2015 | Wang .................. | H04B 10/503 398/81 |

FOREIGN PATENT DOCUMENTS

| | | | | |
|---|---|---|---|---|
| CN | 104579472 A | 4/2015 | | |
| CN | 104917048 A | 9/2015 | | |
| EP | 2602946 A2 | 6/2013 | | |
| JP | H0283523 A | 3/1990 | | |
| JP | H09325215 A | 12/1997 | | |
| JP | 2003198031 A | 7/2003 | | |
| JP | 2004062006 A | 2/2004 | | |
| JP | 2008262109 A | 10/2008 | | |
| JP | 2010252334 A | 11/2010 | | |
| JP | 2013055212 A | 3/2013 | | |
| WO | 2006083527 A2 | 8/2006 | | |
| WO | WO-2006083527 A2 * | 8/2006 | ........... | H04B 10/504 |
| WO | 2008068811 A1 | 6/2008 | | |
| WO | 2012014283 A1 | 2/2012 | | |
| WO | WO-2016058135 A1 * | 4/2016 | ............... | G02B 6/32 |
| WO | 2016070353 A1 | 5/2016 | | |

OTHER PUBLICATIONS

Li et al; High-performance thin film polarizing beam splitter operating at angles than the critical angle; Jun. 2000; Applied Optics, Optical society of America; pp. 1-8. (Year: 2000).*

Kanazawa et al; Low-crosstalk operation of directly modulated DFB laser array TOSA for 112-Gbit/s application; Jun. 2016; Optical Society of America; pp. 1-8. (Year: 2016).*

Berger et al; Tunable MEMS devices for optical networks; Mar. 2003; Optical society of America; pp. 1-9. (Year: 2003).*

Li et al; High-performance thin film polarizing beam splitter operating at angles greater than the critical angle; Jun. 2000; Applied Optics vol. 39, No. 16; pp. 1-8 (Year: 2000).*

Zhang Xiang-wei et al,"Polarization Control of 980 nm High-power Vertical-cavity Surface-emitting Lasers by Using Sub-wavelength Metal-gratings", Chinese Journal of Luminescence, vol. 33 No. 9, Sep. 2012, total 6 pages. With an English Abstiact.

H. Okayama,:'Si wire waveguide polarisation-independentwavelength filter using polarisation rotationBragg grating', Electronics Letters,Oct. 2, 2014,total 2 pages.

Doug Anthon, Jill D.Berger, Michael Hamilton-Smith:"Mems-Tunable Lasers And Filters For Reconfigurable Optical Networks", ECOC, Kloosterstraat 5 9960 Assenede Belgium, vol. 5, Sep. 5, 2004, Sep. 9, 2004, pp. 98-101, XP040380343.

Li L et al: "High-Performance Thin-Film Polarizing Beam Splitter Operating at Angles Greater Than the Critical Angle", Applied Optics, Optical Society of America, Washington, DC; US, vol. 39, No. 16, Jun. 1, 2000, pp. 2754-2771, XP000951760.

* cited by examiner

TRANSMITTER OPTICAL SUBASSEMBLY, OPTICAL COMPONENT, OPTICAL MODULE, AND PASSIVE OPTICAL NETWORK SYSTEM

CROSS-REFERENCE TO RELATED APPLICATION

This application is a continuation of International Patent Application No. PCT/CN2016/112736 filed on Dec. 28, 2016, the disclosure of which is hereby incorporated by reference in its entirety.

TECHNICAL FIELD

This application relates to the communications field, and in particular, to a transmitter optical subassembly, an optical component, an optical module, and a passive optical network system.

BACKGROUND

As commercialization of a 10 G-passive optical network (PON) system is approaching, costs of an optical component in the 10 G-PON have become an important factor affecting industrialization. A laser is an important constituent part of a bidirectional optical subassembly (BOSA) in an optical line terminal (OLT) optical component, and costs of the laser account for a large part of the costs. Compared with a technically complex and expensive 10 G electro-absorption modulated laser (EML), a 10 G direct modulated laser (DML) has absolute advantages in terms of costs, power consumption, and output optical power. However, compared with the EML, the DML has a larger chirp and a lower extinction ratio, and consequently, when transmission is performed at a rate of over 10 G there are a relatively great expense of dispersion and a loss in receiver sensibility in the system.

A recent experimental result indicates that power budget of the DML can meet a requirement when a bias current is high and other parameter settings are proper, but the extinction ratio of the DML is still below 8.2 dB, a standard requirement of the 10 Gigabit-Capable Passive Optical Network (XG-PON). Increasing the extinction ratio can improve sensibility and can better meet a standard. At the expense of power, the DML can cooperate with an etalon (filter) to increase an extinction ratio of an optical signal and achieve negative-chirp compensation and linewidth narrowing.

To reduce a size of an optical component and reduce costs of the optical component, TO packaging (coaxial transistor outline packaging) is used for a transmitter optical subassembly of the DML. FIG. 1 shows a TO packaged transmitter optical subassembly of a DML. The transmitter optical subassembly includes a direct modulated laser, a collimation lens, a single-stage isolator, and an optical branching filter. The optical branching filter includes an optical splitter subassembly and a filter subassembly. The optical splitter subassembly and the filter subassembly are integrated into an all-in-one structure to reduce the size of the optical component. When the transmitter optical subassembly is operating, the DML outputs P-polarized light with single polarization, and after the P-polarized light goes through the single-stage isolator, output light is rotated by 45°. In other words, P-polarized light and S-polarized light, which are mixed polarized light instead of single polarized light, are output. After the mixed polarized light enters the optical branching filter, if an optical splitter with P polarization is used, the P-polarized light passes through the optical branching filter, and all the S-polarized light is reflected, and consequently, a total loss increases by 3 dB, in other words, the loss during the entire process is excessively large; or if a polarization canceling optical splitter is used, because polarization needs to be compensated, the optical splitter has a phase difference, and an optical splitter film is very thick, after reflected light inside the optical branching filter passes through the optical splitter having a large phase difference and the thick optical splitter film, a wavelength output by the optical branching filter has a large offset, and the output light has two peaks, which is unfavorable for the device to lock the wavelength.

SUMMARY

This application provides a transmitter optical subassembly, an optical component, an optical module, and a passive optical network system, to reduce a polarization loss of the transmitter optical subassembly, increase output optical power, and enable the optical component to better implement a wavelength locking function.

This application provides a transmitter optical subassembly, where the transmitter optical subassembly includes a substrate and a direct modulated laser disposed on the substrate, and a single-stage isolator, a polarization direction rotator, and an optical branching filter are disposed side by side on the substrate in a light propagation direction; and the polarization direction rotator can adjust linearly polarized light to P-polarized light, the optical branching filter includes an optical splitter subassembly and a filter subassembly, and an optical splitter film in the optical splitter subassembly is an optical splitter film with P polarization.

In the foregoing embodiment, the polarization direction rotator adjusts the incident linearly polarized light to the P-polarized light, and the optical splitter film in the optical branching filter is the optical splitter film with P polarization; therefore, all P-polarized light with single polarization can pass through the optical branching filter, without causing any polarization loss or two peaks. In this way, output optical power of the transmitter optical subassembly is increased.

In an implementation, the polarization direction rotator is a half-wave plate.

In another implementation, the polarization direction rotator is a Faraday rotating plate.

To reduce a size of the transmitter optical subassembly, so that the transmitter optical subassembly can implement coaxial transistor outline packaging and reduce costs, the polarization direction rotator and the optical branching filter are integrated into an all-in-one structure.

In addition, a collimation lens is further disposed between the direct modulated laser and the single-stage isolator.

This application further provides an optical component, including the transmitter optical subassembly according to any one of the above. A polarization direction rotator in the transmitter optical subassembly adjusts incident linearly polarized light to P-polarized light, and all P-polarized light with single polarization can pass through an optical splitter in an optical branching filter. In this way, a polarization loss or two peaks in output light is prevented, and the optical component can better implement a wavelength locking function.

This application further provides an optical module, including the foregoing optical component. The optical module is responsible for performing optical-to-electrical conversion and transmission on a network signal.

This application further provides a passive optical network system, where the system includes an optical line terminal and an optical network unit, the optical line terminal is connected to the optical network unit by using a passive optical distribution network, and the optical line terminal includes the foregoing optical component or the optical network unit includes the foregoing optical component.

DESCRIPTION OF EMBODIMENTS

The following describes this application with reference to the accompanying drawings.

Figure 2:
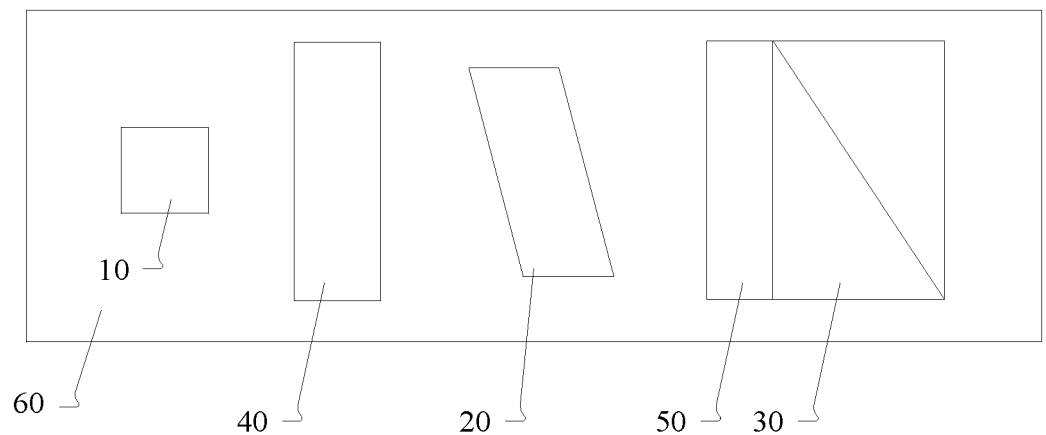
FIG. 2 is a simple structural diagram of a transmitter optical subassembly according to an embodiment of this application.

FIG. 2 shows a transmitter optical subassembly. The transmitter optical subassembly includes a substrate 60 and a direct modulated laser 10 disposed on the substrate 60, and a single-stage isolator 20, a polarization direction rotator 50, and an optical branching filter 30 are disposed side by side on the substrate 60 in a light propagation direction.

The polarization direction rotator 50 is configured to adjust linearly polarized light to P-polarized light. In addition, the optical branching filter 30 includes an optical splitter subassembly and a filter subassembly, and an optical splitter film in the optical splitter subassembly is an optical splitter film with P polarization.

In the foregoing embodiment, the polarization direction rotator 50 adjusts the incident linearly polarized light to the P-polarized light with single polarization, and the optical splitter film in the optical branching filter 30 is the optical splitter film with P polarization; therefore, all the P-polarized light with single polarization can pass through the optical splitter in the optical branching filter 30, without causing any polarization loss or two peaks. In this way, output optical power of the transmitter optical subassembly is increased.

A structure and an operating principle of the transmitter optical subassembly are described in the following in detail.

As shown in FIG. 2, the transmitter optical subassembly includes the substrate 60, the direct modulated laser 10 is disposed on the substrate 60, and the direct modulated laser 10 can emit the P-polarized light with single polarization, and the single-stage isolator 20, the polarization direction rotator 50, and the optical branching filter 30 are disposed side by side on the substrate 60 in the light propagation direction. A collimation lens 40 is further disposed between the direct modulated laser 10 and the single-stage isolator 20, and divergent P-polarized light emitted from the direct modulated laser 10 passes through the collimation lens 40 and then becomes parallel P-polarized light. After passing through the collimation lens 40, the P-polarized light enters the single-stage isolator 20. The P-polarized light with single polarization is rotated by the single-stage isolator 20 by 45°, and becomes 45° linearly polarized light, in other words, P-polarized light and S-polarized light, which are mixed polarized light instead of single polarized light. After the 45° linearly polarized light is emitted from the single-stage isolator 20 and enters the polarization direction rotator 50, the polarization direction rotator 50 adjusts the incident linearly polarized light to the P-polarized light. During specific setting, the polarization direction rotator 50 is a half-wave plate or may be a Faraday rotating plate. The P-polarized light with single polarization is emitted from the polarization direction rotator 50 and enters the optical branching filter 30. The optical branching filter 30 includes the optical splitter subassembly and the filter subassembly, and the optical splitter film in the optical splitter subassembly is the optical splitter film with P polarization. Therefore, all the P-polarized light with single polarization can pass through the optical splitter. In this way, output optical power of the transmitter optical subassembly is increased, and a prior-art problem that a polarization loss and two peaks occur on the optical branching filter 30 is resolved. In addition, the optical splitter in the optical branching filter 30 uses the optical splitter film with P polarization. A film system of the optical splitter film has a simple design and is low-cost, and therefore costs are reduced. The optical splitter subassembly and the filter subassembly are integrated into an all-in-one structure, thereby reducing a size of the transmitter optical subassembly. Likewise, the polarization direction rotator 50 and the optical branching filter 30 may be also integrated into an all-in-one structure. In this way, output power of a TO (coaxial transistor outline) can reach maximum within a narrow TO space.

This application further provides an optical component, including the foregoing transmitter optical subassembly. The transmitter optical subassembly is configured to convert an electrical signal into an optical signal. A polarization direction rotator with P polarization and an optical branching filter 30 with an optical splitter film with P polarization are disposed on the transmitter optical subassembly, thereby increasing output optical power and enabling the optical component to better implement a wavelength locking function. In addition, a polarization direction rotator 50 and the optical branching filter are integrated into an all-in-one structure, thereby reducing a size of the transmitter optical subassembly to implement coaxial transistor outline packaging, and reducing costs. The optical component further includes: a receiver optical subassembly, configured to receive an optical signal and converts the optical signal into an electrical signal. The transmitter optical subassembly and the receiver optical subassembly are a basis for normal communication of an entire network.

This application further provides an optical module. The optical module includes the foregoing optical component, and further includes a modular circuit board. The optical module is responsible for performing optical-to-electrical conversion and transmission on a network signal.

Figure 3:
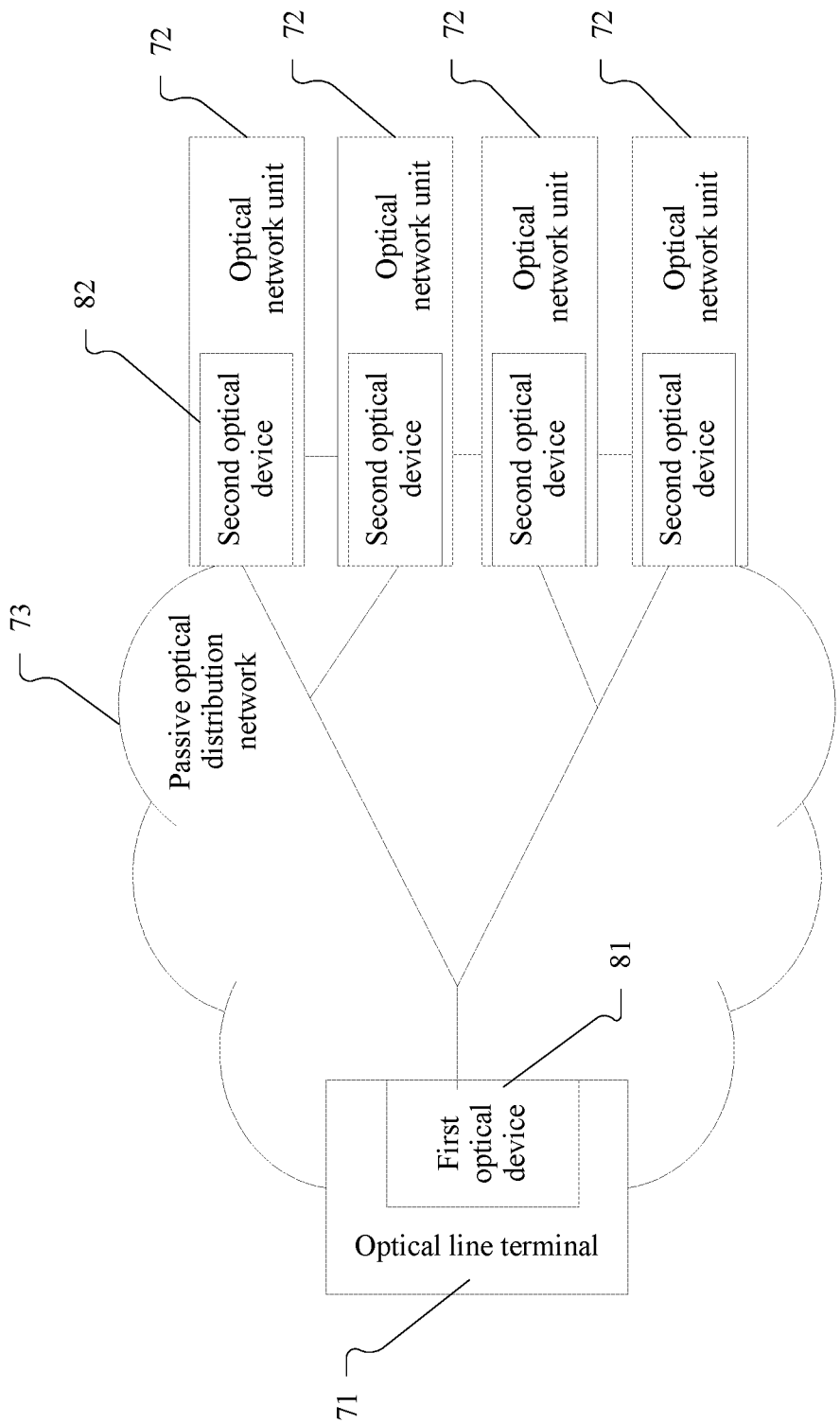
FIG. 3 is a schematic diagram of a passive optical network system according to an embodiment of this application.

This application further provides a passive optical network system. As shown in FIG. 3, the passive optical network system includes at least one optical line terminal (OLT) 71, a plurality of optical network units (ONU) 72, and one passive optical distribution network (ODN) 73. The optical line terminal 71 is connected to the plurality of optical network units 72 in a point-to-multipoint manner by using the passive optical distribution network 73. A TDM mechanism, a WDM mechanism, or a hybrid TDM/WDM mechanism may be used for communication between the optical line terminal 71 and the optical network units 72. Directions from the optical line terminal 71 to the optical network units 72 are defined as downstream directions, and directions from the optical network units 72 to the optical line terminal 71 are defined as upstream directions.

The passive optical network system may be a communications network for distributing data between the optical line terminal 71 and the optical network units 72 without needing any active device. In a specific embodiment, data between the optical line terminal 71 and the optical network units 72 may be distributed by a passive optical component (for example, an optical splitter) in the passive optical distribution network 73. The passive optical network system may be an asynchronous transfer mode passive optical network (ATM PON) system or a broadband passive optical network (BPON) system defined in the ITU-T G983 standard, a gigabit-capable passive optical network (GPON) system defined in the ITU-T G984 series standard, an Ethernet passive optical network (EPON) system, a wavelength division multiplexing passive optical network (WDM PON) system, or a next generation access passive optical network system (NGA PON system, for example, an XGPON system defined in the ITU-T G987 series standard, a 10 G-EPON system defined in the IEEE 802.3av standard, or a hybrid TDM/WDM PON system) defined in the IEEE 802.3ah standard. All content of the various passive optical network systems defined in the foregoing standards is incorporated in this application document by reference in its entirety.

The optical line terminal 71 is usually located at a central location (for example, a central office (CO)), and can manage all the plurality of optical network units 72. The optical line terminal 71 may serve as a medium between the optical network units 72 and an upper-layer network (not shown in the figure), to forward data received from the upper-layer network as downstream data to the optical network units 72, and forward upstream data received from the optical network units 72 to the upper-layer network. A specific structural configuration of the optical line terminal 71 may vary with a specific type of the passive optical network system. In an embodiment, the optical line terminal 71 includes a first optical component 81 and a data processing module (not shown in the figure). The first optical component 81 may convert downstream data processed by the data processing module, into a downstream optical signal; send, by using the passive optical distribution network 73, the downstream optical signal to the optical network units 72; receive an upstream optical signal sent by the optical network units 72 by using the passive optical distribution network 73; and convert the upstream optical signal into an electrical signal, and provide the electrical signal for the data processing module for processing.

The optical network units 72 may be disposed at locations on a customer side (for example, customer premises) in a distributed manner. The optical network units 72 may be network devices configured for communication between the optical line terminal 71 and a customer. Specifically, the optical network units 72 may serve as media between the optical line terminal 71 and the customer. For example, the optical network units 72 may forward downstream data received from the optical line terminal 71 to the customer, and forward data received from the customer as upstream data to the optical line terminal 71. A specific structural configuration of the optical network units 72 may vary with a specific type of the passive optical network system. In an embodiment, the optical network units 72 include a second optical component 82. The second optical component 82 is configured to receive a downstream data signal sent by the optical line terminal 71 by using the passive optical distribution network 73, and send an upstream data signal to the optical line terminal 71 by using the passive optical distribution network 73. It should be understood that in this application document, structures of the optical network units 72 are similar to a structure of an optical network terminal (ONT). Therefore, in the solution provided in this application document, the optical network unit and the optical network terminal are interchangeable.

Figure 1:
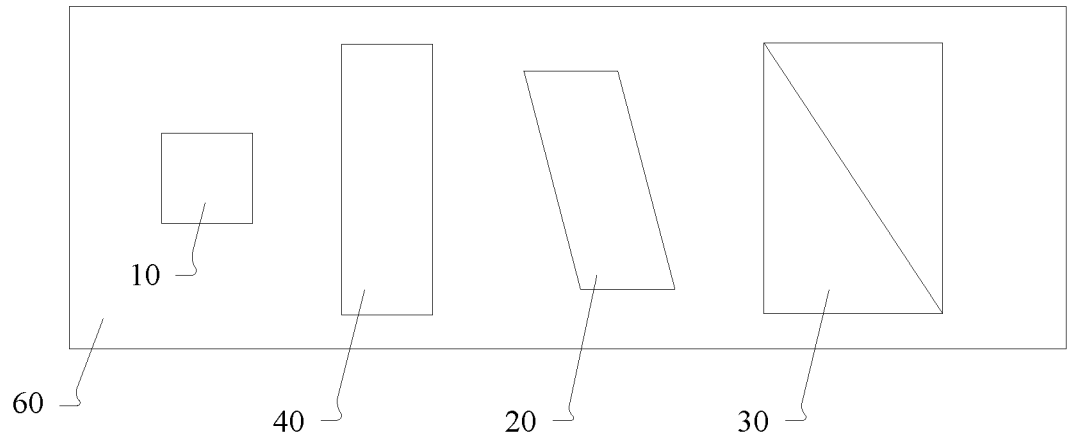
FIG. 1 is a simple structural diagram of a transmitter optical subassembly in the prior art.

The passive optical distribution network 73 may be a data distribution system, and may include an optical fiber, an optical coupler, an optical multiplexer/demultiplexer, an optical splitter, and/or another device. In an embodiment, the optical fiber, the optical coupler, the optical multiplexer/demultiplexer, the optical splitter, and/or another device each may be a passive optical component. Specifically, the optical fiber, the optical coupler, the optical multiplexer/demultiplexer, the optical splitter, and/or another device each may be a device for distributing data signals between the optical line terminal 71 and the optical network units 72 without needing support of a power supply. In addition, in another embodiment, the passive optical distribution network 73 may further include one or more processing devices, for example, an optical amplifier, or a relay device (Relay device). In a branch structure shown in FIG. 1, the passive optical distribution network 73 may specifically extend from the optical line terminal 71 to the plurality of optical network units 72, or may be configured as any other point-to-multipoint structure.

The first optical component 81 or the second optical component 82 may be a pluggable optical receiver and transceiver subassembly that has optical signal transmitting and receiving functions, an optical-to-electrical conversion function, and an optical time domain reflectometer (OTDR) testing function. For example, the first optical component 81 in the optical line terminal 71 includes a transmitter optical subassembly, a receiver optical subassembly, and an OTDR testing subassembly. The transmitter optical subassembly is configured to: deliver a downstream data signal to the optical network units 72 by using the passive optical distribution network 73; and when a fiber optic network and a PON device need to be detected, test a control signal by using an OTDR provided by the OTDR testing subassembly, and modulate the control signal tested by the OTDR, into a downstream data signal, and output the downstream data signal to the passive optical distribution network 73. The receiver optical subassembly is configured to: receive an upstream data signal transferred by the passive optical distribution network 73 from the optical network unit 72, convert the upstream data signal into an electrical signal through optical-to-electrical conversion, and forward the electrical signal to a control module or a data processing module (not shown in the figure) in the optical line terminal 71 for processing.

It can be learned from the foregoing description that the passive optical network system includes the optical line terminal and the optical network unit, the optical line terminal is connected to the optical network unit by using the passive optical distribution network, and the optical line terminal includes the optical component or the optical network unit includes the optical component. The optical component is a basis for normal communication of an entire network, and the transmitter optical subassembly is an important constituent part of the optical component.

Various modifications and variations to the embodiments can be made without departing from the spirit and scope of this application. This application is intended to cover these modifications and variations of this application provided that they fall within the scope of protection defined by the following claims of this application and their equivalent technologies.

What is claimed is:

1. A transmitter optical subassembly, comprising:
a substrate and a direct modulated laser disposed on the substrate, wherein a single-stage isolator, a polarization direction rotator, and an optical branching filter are disposed side by side on the substrate in a light propagation path, and wherein
the polarization direction rotator is configured to adjust linearly polarized light to P-polarized light, and wherein the optical branching filter includes an optical splitter subassembly and a filter subassembly, and wherein an optical splitter film in the optical splitter subassembly is the optical splitter film with P polarization.

2. The transmitter optical subassembly according to claim 1, wherein the polarization direction rotator is a half-wave plate.

3. The transmitter optical subassembly according to claim 1, wherein the polarization direction rotator is a Faraday rotating plate.

4. The transmitter optical subassembly according to claim 1, wherein the polarization direction rotator and the optical branching filter are integrated into an all-in-one structure.

5. The transmitter optical subassembly according to claim 1, wherein a collimation lens is further disposed between the direct modulated laser and the single-stage isolator.

6. An optical module, comprising:
a transmitter optical subassembly-, wherein the transmitter optical subassembly includes a substrate and a direct modulated laser disposed on the substrate, wherein a single-stage isolator, a polarization direction rotator, and an optical branching filter are disposed side by side on the substrate in a light propagation path, and wherein
the polarization direction rotator is configured to adjust linearly polarized light to P-polarized light, and wherein the optical branching filter includes an optical splitter subassembly and a filter subassembly, and wherein an optical splitter film in the optical splitter subassembly is the optical splitter film with P polarization.

7. The optical module according to claim 6, wherein the polarization direction rotator is a half-wave plate.

8. The optical module according to claim 6, wherein the polarization direction rotator is a Faraday rotating plate.

9. The optical module according to claim 6, wherein the polarization direction rotator and the optical branching filter are integrated into an all-in-one structure.

10. The optical module according to claim 6, wherein a collimation lens is further disposed between the direct modulated laser and the single-stage isolator.

11. A passive optical network (PON) device, comprising:
an optical module including a transmitter optical subassembly, wherein the transmitter optical subassembly includes a substrate and a direct modulated laser disposed on the substrate, wherein a single-stage isolator, a polarization direction rotator, and an optical branching filter are disposed side by side on the substrate in a light propagation path, and wherein
the polarization direction rotator is configured to adjust linearly polarized light to P-polarized light, wherein the optical branching filter includes an optical splitter subassembly and a filter subassembly, and wherein an optical splitter film in the optical splitter subassembly is the optical splitter film with P polarization.

12. The PON device according to claim 11, wherein the polarization direction rotator is a half-wave plate.

13. The PON device according to claim 11, wherein the polarization direction rotator is a Faraday rotating plate.

14. The PON device according to claim 11, wherein the polarization direction rotator and the optical branching filter are integrated into an all-in-one structure.

15. The PON device according to claim 11, wherein a collimation lens is further disposed between the direct modulated laser and the single-stage isolator.

16. The PON device according to claim 11, wherein the PON device is an optical line terminal.

17. The PON device according to claim 11, wherein the PON device is an optical network unit.

* * * * *